United States Patent Office 2,765,569
Patented Oct. 9, 1956

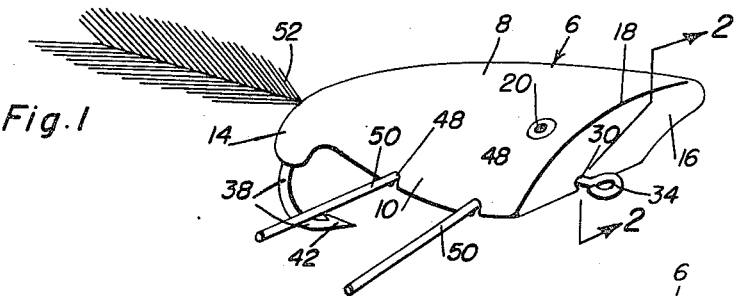
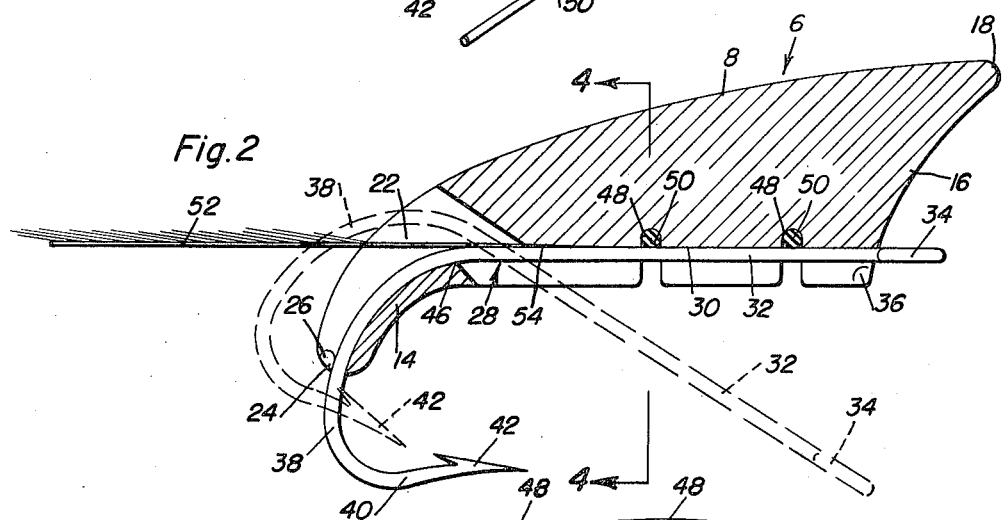
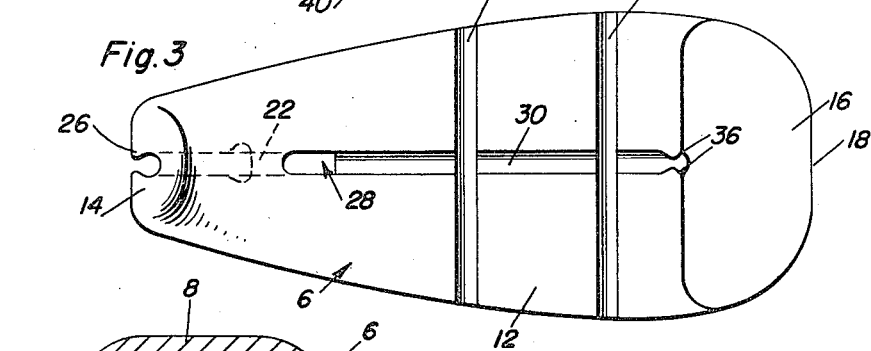
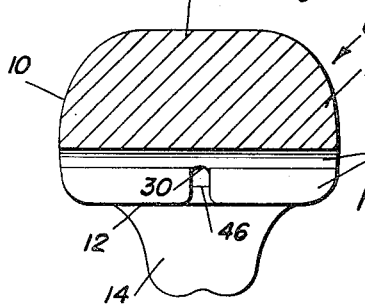
Arthur W. Claybrook
INVENTOR.

2,765,569

FISH LURE

Arthur W. Claybrook, Cincinnati, Ohio

Application October 18, 1954, Serial No. 462,690

2 Claims. (Cl. 43—42.26)

The present invention relates, broadly classified, to artificial bait and has more particular reference to a multi-purpose fishing lure which is characterized by a plug-type body and a complemental readily attachable and detachable conventional-type fishhook which lends itself to practical use for so-called standard casting, spinning casting and fly casting.

With a view toward providing a satisfactorily constructed lure which will aptly meet the requirements of the aforementioned methods of fishing, the body may be of wood, metal, commercial plastics of appropriate grades, may be of any appropriate color or colors, and has to do with a body which may be either hollow and buoyant for surface use, or solid and of sufficient mass or weight for underwater fishing.

It is an object of the invention to structurally, functionally and otherwise improve upon similarly constructed and performing lures and, in carrying out this aspect of the invention, any number of bodies will be included, each body being of standardized size and shape, but of a different color or finish whereby a single fishhook which is attached to the line may be detachably connected with a selected body, whereby the bodies are thus interchangeable with respect to weight and color and finish without having to change the hook, already attached to the fishing line, this featured phase of the invention being thought to be especially advantageous in the use of lures in the fly casting size or category.

A further objective, structurally construed, has to do with a body which is shaped in imitation of the desired type or style of fish bait, said body characterized by a dorsal, ventral and lengthwise side surfaces, having a head at the leading end, and a tail at the trailing end, said tail being arcuate in side elevation with its terminal portion curving and directed downwardly to a position below the plane of said ventral surface and having a correspondingly arcuate groove with its rearward end opening through the tip of the terminal portion and its forward end opening through said ventral surface, and a fishhook having a straight shank paralleling and releasably connected to said ventral portion and a barbed hook having the usual arcuate bend joining the rearward end of the shank, the latter seated in part in said groove and the rearward end portion of said shank passing through the forward open end of the groove, the curvature and length of the groove serving to allow said hook to be handily manipulated and maneuvered and thus fitted into or removed from said groove by way of the open forward end of said groove, that is, when said shank is released and thus detached from said ventral surface.

Then, too, the invention has to do with the structure above set forth and the combination therewith of a complemental longitudinal groove in said ventral portion with its forward end opening through the leading end of said ventral portion and its rearward end aligned and registering with the forward end of said first named groove, said shank being of a length greater than that of the longitudinal groove and having a line eye on its forward end positioned in advance of the leading end of said body.

In addition to the above, novelty is predicated on the structural aspects so far alluded to and, what is important, the provision of additional grooves, ancillary to the stated longitudinal groove. These additional grooves are formed in the ventral surface, are parallel to and spaced from each other and extend transversely across the longitudinal groove at their respective central portion, being at right angles to said longitudinal groove. The additional grooves are deeper than the longitudinal groove, and they provide recesses for the accommodation of rubber or equivalent flexible and resilient elements of a vibratory type which constitute whiskers or legs and are seated removably in the additional grooves and are clampingly held therein by way of the releasably retained shank of the stated fishhook.

Features and advantages in addition to those enumerated will become more readily apparent from the detailed description and the concluding claims.

In the drawings:

Figure 1 is a perspective view of a fishing lure constructed in accordance with the principles of the present invention and ready for use;

Figure 2 is a view which is essentially in section but partially in elevation and which is on an enlarged scale and taken on the irregular vertical line 2—2 of Figure 1, looking in the direction of the arrows, and which shows the separable or detachable association between the fishhook and the lure body;

Figure 3 is a bottom plant view of the body minus the fishhook and aforementioned vibratory legs; and Figure 4 is a cross-section on the vertical line 4—4 of Figure 2, looking in the direction of the arrows.

Referring now to the drawings with the aid of reference numerals and accompanying lead lines, the body is denoted by the numeral 6, and this, as before mentioned, may be of wood, metal or plastics, and may be hollow and buoyant, solid and buoyant, or solid and of sufficient weight or mass that it will sink in the water, whereby to provide either a surface lure or an underwater lure, as desired. The top or dorsal surface 8 along with the lengthwise opposite longitudinal side surfaces 10—10 is convex. The bottom or ventral surface is essentially flat, and is denoted by the numeral 12. The rear end of the body tapers gradually in cross-section and it terminates in an arcuately and downwardly directed tail portion 14. The leading or forward end is concave and slants rearwardly and downwardly, as at 16, and defines a protruding lip 18 which in conjunction with the associated portion and eyes 20 defines the head. There is an arcuate groove or channel 22 in the central part of the tail portion which opens at its trailing end through the trailing end of the tail portion, as at 24, and is provided on the interior surface of the walls with opposed embossments 26 which constitute detents. The forward end of this groove opens, as generally denoted at 28, through the ventral surface. More specifically, it opens into and communicates with a centrally disposed linearly straight lengthwise groove or second channel 30, and these grooves serve to accommodate the conventional-type fishhook. The fishhook comprises a shank 32 of a length which is removably seated or located in the groove 30 with the forward end terminating in a line eye 34 which extends beyond the concave leading end 16. The interior surfaces of the channel walls at this point are provided with additional embossments 36 which provide detents and which serve to hold the shank 32 releasably in the groove. The hook portion of the fishhook is located in the first named channel or groove 22. That is to say, the arcuate bend 38 thereof conformingly fits in this groove, or, contrawise, the groove is shaped to fit the bend of the hook. The return bend 40 extends outwardly beyond the terminal end 24 of the groove and terminates in the usual barbed bill or beak portion 42. It will be clear from Figure 2 that these grooves and hook coincide in shape and size so that the hook is readily insertable and removable. That is to say, by pressing downwardly with a finger on the eye 34, the shank of the hook may be released or snapped out of the groove 30 and the hook end may be fulcrumed on the fulcrum point 46 in Figure 2 and manipulated and maneuvered so that by continuing to move the shank around in a circular path, the hook portion may be gradually fed through the forward end of the groove 24 and out through the passage 28. By reversing the procedure, it may be placed in position and releasably snapped in place to assume the position seen in Figure 2 in full lines.

The aforementioned ancillary or auxiliary grooves are denoted at 48—48 and they are in parallelism and are transversely disposed and have their central portions crossing the groove 30 in the manner brought out in Figure 3. They open through the opposite sides 10—10 in the body. They serve to accommodate rubber feelers or vibratory legs as they are sometimes called. That is to say, cylindrical rubber members 50—50 are employed, and these are seated in the auxiliary grooves and they are held in place by the shank 30 which bridges these auxiliary grooves in an obvious manner.

If desired, a feather or equivalent ornament 52 may be utilized and this may be releasably mounted in place by wedging the stem of the feather in between the bottom of the groove 30 and the shank of the fishhook, as denoted at the point 54 in Figure 2.

Since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A fish lure comprising a body shaped in limitation of a suitable fish bait and characterized by complemental dorsal, ventral and lengthwise surfaces, having a head at its leading end, and a tail at its trailing end, said tail being arcuate in side elevation and with terminal portion curving and directed downwardly to a position below the plane of said ventral surface and having a correspondingly arcuate groove with its rearward end opening through the tip of the terminal portion and its forward end opening through said ventral surface, a fishhook having a straight shank paralleling and releasably connected to said ventral surface and a barbed hook having the usual arcuate bend joining the rearward end of the shank, the latter seated in part in said groove and the rearward end portion of said shank passing through the forward open end of the groove, the arcuity and length of the groove serving to allow said hook to be handily manipulated and maneuvered and thus fitted into or removed from said groove by way of the open forward end of said groove, that is, when said shank is released and thus detached from said ventral surface, a complemental longitudinal groove in said ventral surface with its forward end opening through the leading end of said ventral surface and its rearward end aligned and registering with the forward end of said first named groove, said shank being of a length greater than that of the longitudinal groove and having a line eye on its forward end positioned in advance of the leading end of said body, the rearward end of the wall portions of the first named groove and forward end portions of the walls of said second named groove being provided with opposed pairs of embossments constituting detents, the latter serving to hold the fishhook releasably in said grooves.

2. A fish lure comprising a body shaped in imitation of a suitable fish bait and characterized by complemental dorsal, ventral and lengthwise surfaces, having a head at its leading end, and a tail at its trailing end, said tail being arcuate in side elevation with its terminal portion curving and directed downwardly to a position below the plane of said ventral surface and having a correspondingly arcuate groove with its rearward end opening through the tip of the terminal portion and its forward end opening through said ventral surface, a fishhook having a straight shank paralleling and releasably connected to said ventral surface and a barbed hook having the usual arcuate bend joining the rearward end of the shank, the latter seated in part in said groove and the rearward end portion of said shank passing through the forward open end of the groove, the arcuity and length of the groove serving to allow said hook to be handily manipulated and maneuvered and thus fitted into or removed from said groove by way of the open forward end of said groove, that is, when said shank is released and thus detached from said ventral surface, a complemental longitudinal groove in said ventral surface with its forward end opening through the leading end of said ventral surface and its rearward end aligned and registering with the forward end of said first named groove, said shank being of a length greater than that of the longitudinal groove and having a line eye on its forward end positioned in advance of the leading end of said body, additional grooves, auxiliary to said longitudinal groove, formed in said ventral surface and parallel to each other and extending transversely and thus crossing said longitudinal groove at right angles to the latter, said additional grooves being deeper than said longitudinal groove, flexible leg forming elements seated removably in said additional grooves and clampingly held therein by way of the shank of said fishhook, the rearward end of the wall portions of said arcuate groove and forward end of the wall portions of the longitudinal groove being provided with opposed pairs of embossments constituting detents, serving to hold the fishhook releasably in said grooves.

References Cited in the file of this patent

UNITED STATES PATENTS

| | | |
|---|---|---|
| 2,013,898 | Ridenour | Sept. 10, 1935 |
| 2,215,971 | Miles | Sept. 24, 1940 |
| 2,572,608 | Gabor | Oct. 23, 1951 |
| 2,587,736 | Kindscher | Mar. 4, 1952 |
| 2,651,133 | Sharps | Sept. 8, 1953 |
| 2,661,564 | Weigandt | Dec. 8, 1953 |

FOREIGN PATENTS

| | | |
|---|---|---|
| 81,897 | Norway | June 8, 1953 |